(12) United States Patent
Son et al.

(10) Patent No.: US 12,176,508 B2
(45) Date of Patent: Dec. 24, 2024

(54) BATTERY RACK AND ENERGY STORAGE DEVICE COMPRISING BATTERY RACK

(71) Applicant: LG ENERGY SOLUTION, LTD., Seoul (KR)

(72) Inventors: Kown Son, Daejeon (KR); Goan-Su Jung, Daejeon (KR); Jong-Soo Lee, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 17/615,639

(22) PCT Filed: Mar. 4, 2021

(86) PCT No.: PCT/KR2021/002711
§ 371 (c)(1),
(2) Date: Dec. 1, 2021

(87) PCT Pub. No.: WO2021/177761
PCT Pub. Date: Sep. 10, 2021

(65) Prior Publication Data
US 2022/0320632 A1 Oct. 6, 2022

(30) Foreign Application Priority Data
Mar. 4, 2020 (KR) ........................ 10-2020-0027371

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/6556* (2015.04); *H01M 50/204* (2021.01); *H01M 50/24* (2021.01)

(58) Field of Classification Search
CPC .. A62C 3/16; H01M 10/613; H01M 10/6556; H01M 10/6567; H01M 2220/10;
(Continued)

(56) References Cited

U.S. PATENT DOCUMENTS

| 2013/0130073 A1 | 5/2013 | Kim et al. |
| 2014/0253014 A1 | 9/2014 | Nishikawa et al. |

(Continued)

FOREIGN PATENT DOCUMENTS

| CN | 102416233 B | 8/2016 |
| CN | 104001297 B | 8/2016 |

(Continued)

OTHER PUBLICATIONS

Extended European Search Report for European Application No. 21764493.9, dated Mar. 3, 2023.
(Continued)

*Primary Examiner* — Victoria H Lynch
(74) *Attorney, Agent, or Firm* — Birch, Stewart, Kolasch & Birch, LLP

(57) ABSTRACT

A battery rack includes a plurality of battery modules including at least one battery cell and a module case configured to accommodate the at least one battery cell and including a fire extinguishing unit capable of supplying a fire extinguishing agent into the module case when thermal runaway or fire occurs in the at least one battery cell; a rack case configured to accommodate the plurality of battery modules; and a drainage guide unit provided to the rack case and configured to guide the fire extinguishing agent used when the thermal runaway or fire occurs to be drained.

15 Claims, 12 Drawing Sheets

(51) Int. Cl.
*H01M 10/6556* (2014.01)
*H01M 50/204* (2021.01)
*H01M 50/24* (2021.01)

(58) Field of Classification Search
CPC .. H01M 50/204; H01M 50/209; H01M 50/24; H01M 50/691; Y02E 60/10
See application file for complete search history.

(56) References Cited

U.S. PATENT DOCUMENTS

| | | |
|---|---|---|
| 2018/0248160 A1 | 8/2018 | Lee |
| 2018/0269440 A1 | 9/2018 | Lee et al. |
| 2020/0139178 A1* | 5/2020 | Olivo .................... A62C 35/68 |
| 2020/0153059 A1 | 5/2020 | Lee et al. |

FOREIGN PATENT DOCUMENTS

| | | |
|---|---|---|
| CN | 107185133 A | 9/2017 |
| CN | 108028334 A | 5/2018 |
| CN | 108140773 A | 6/2018 |
| CN | 207517760 U | 6/2018 |
| CN | 109999386 A | 7/2019 |
| CN | 199985335 A | 7/2019 |
| CN | 110649194 A | 1/2020 |
| CN | 210052822 U | 2/2020 |
| DE | 10 2013 017 068 A1 | 4/2015 |
| JP | 2003-346922 A | 12/2003 |
| JP | 2013-179006 A | 9/2013 |
| JP | 2014-90782 A | 5/2014 |
| JP | 2018-63765 A | 4/2018 |
| JP | 2019-75191 A | 5/2019 |
| KR | 10-2013-0056530 A | 5/2013 |
| KR | 10-1647427 B1 | 8/2016 |
| KR | 10-1706717 B1 | 3/2017 |
| KR | 10-1918022 B1 | 11/2018 |
| KR | 10-1939812 B1 | 1/2019 |
| KR | 10-2019-0084519 A | 7/2019 |
| KR | 10-2021072 B1 | 11/2019 |
| KR | 10-2050803 B1 | 12/2019 |
| WO | WO 2013/080835 A1 | 6/2013 |

OTHER PUBLICATIONS

International Search Report for PCT/KR2021/002711 (PCT/ISA/210) mailed on Jun. 15, 2021.

* cited by examiner

BATTERY RACK AND ENERGY STORAGE DEVICE COMPRISING BATTERY RACK

TECHNICAL FIELD

The present disclosure relates to a battery rack and an energy storage system including the battery rack.

The present application claims priority to Korean Patent Application No. 10-2020-0027371 filed on Mar. 4, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components. The battery pack is generally provided as an energy source of an electric vehicle or the like, and recently, an energy storage system including a plurality of battery racks is attracting attention as an energy source for home or industrial use.

However, the conventional battery pack or battery rack includes a plurality of battery modules, and if thermal runaway occurs in the battery cells of each battery module to cause ignition or explosion, heat or flame is transferred to neighboring battery cells, which may result in secondary explosion or the like. Thus, efforts are being made to more rapidly prevent secondary ignition or explosion.

To prevent such a thermal runaway, when the temperature of a battery cell of a specific battery module increases abnormally, a method of directly injecting a fire extinguishing water into the overheated battery module is being considered. Moreover, in this case, it is an important issue to drain the fire extinguishing water and prevent the fire extinguishing water used for fire suppression of a specific battery module from flowing toward neighboring battery modules.

DISCLOSURE

Technical Problem

The present disclosure is designed to solve the problems of the related art, and therefore the present disclosure is directed to providing a battery rack capable of more rapidly extinguishing thermal runaway or fire at an early stage when thermal runaway or fire occurs in the battery module, and an energy storage system including the battery rack.

Moreover, the present disclosure is also directed to providing a battery rack capable of guiding a fire extinguishing agent used for fire suppression of battery modules of the battery rack to be drained, and an energy storage system including the battery rack.

In addition, the present disclosure is also directed to providing a battery rack capable of preventing the fire extinguishing agent used for fire suppression of a specific battery module of the battery rack from flowing toward neighboring battery modules, and an energy storage system including the battery rack.

Technical Solution

In one aspect of the present disclosure, there is provided a battery rack, comprising: a plurality of battery modules, each battery module of the plurality of battery modules including at least one battery cell, a module case configured to accommodate the at least one battery cell, and a fire extinguisher capable of supplying a fire extinguishing agent into the module case when thermal runaway or fire occurs in the at least one battery cell; a rack case configured to accommodate the plurality of battery modules; and a drainage guide provided to the rack case and configured to guide the fire extinguishing agent used when the thermal runaway or fire occurs.

The drainage guide may be respectively provided between the plurality of battery modules inside the rack case.

The drainage guide may be disposed to have a predetermined slope along a front to rear direction of the rack case.

The drainage guide may be is downwardly inclined from a front side of the rack case to a rear side of the rack case.

The battery rack may further comprise a fire extinguishing agent discharge pipe connected to the drainage guide and configured to discharge the fire extinguishing agent.

The fire extinguishing agent discharge pipe may be provided at a rear side of the rack case.

The drainage guide may include a guide channel for guiding the fire extinguishing agent to move for drainage.

The drainage guide may be made of plastic or copper.

The fire extinguishing agent may be water.

In addition, the present disclosure also provides an energy storage system, comprising at least one battery rack according to the above embodiments.

Advantageous Effects

According to various embodiments as above, it is possible to provide a battery rack capable of more rapidly extinguishing thermal runaway or fire at an early stage when thermal runaway or fire occurs in the battery module, and an energy storage system including the battery rack.

Moreover, according to various embodiments as above, it is possible to provide a battery rack capable of guiding a fire extinguishing agent used for fire suppression of battery modules of the battery rack to be drained, and an energy storage system including the battery rack.

In addition, according to various embodiments as above, it is possible to provide a battery rack capable of preventing the fire extinguishing agent used for fire suppression of a specific battery module of the battery rack from flowing toward neighboring battery modules, and an energy storage system including the battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
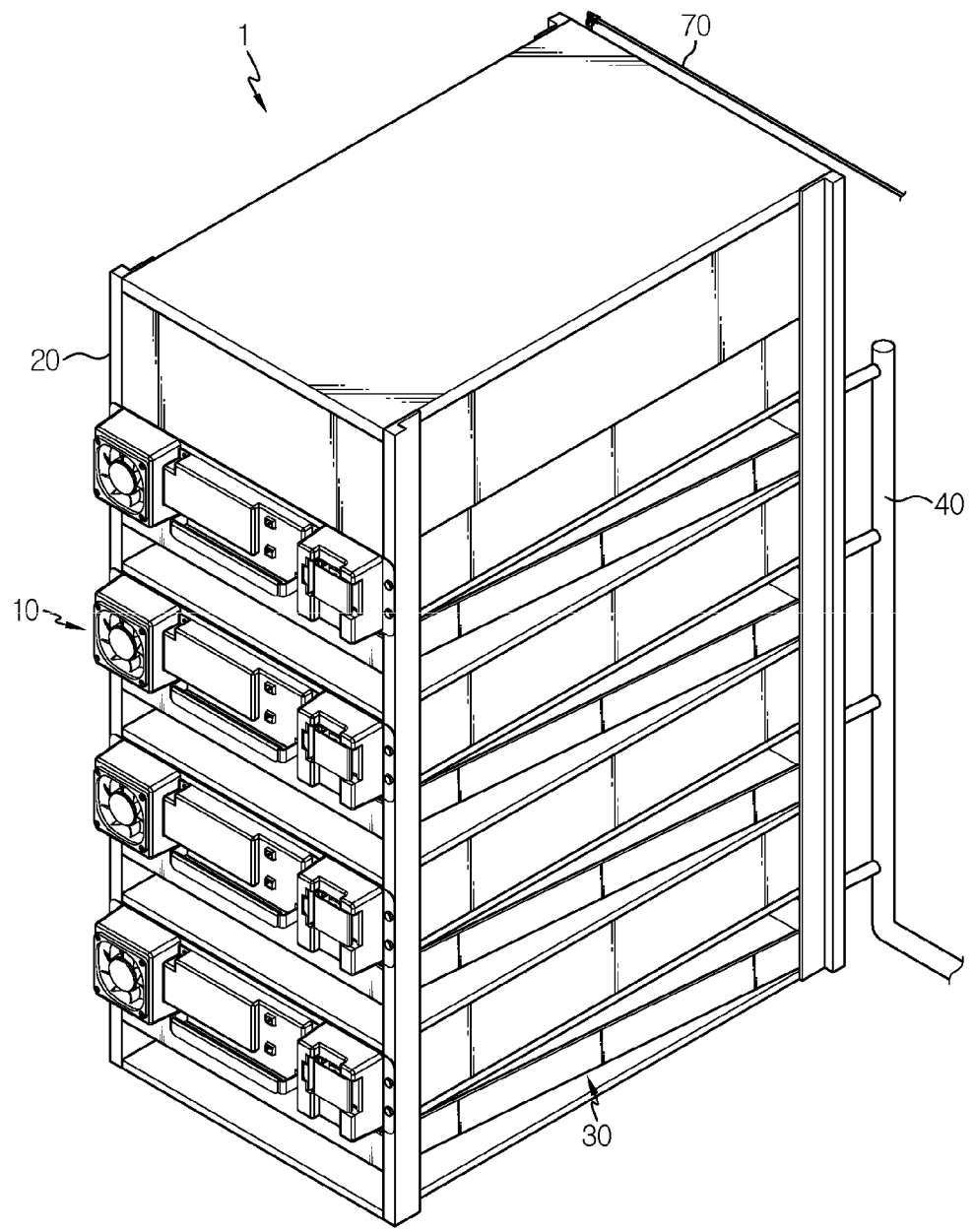
FIG. 1 is a diagram for illustrating a battery rack according to an embodiment of the present disclosure.
Figure 2:
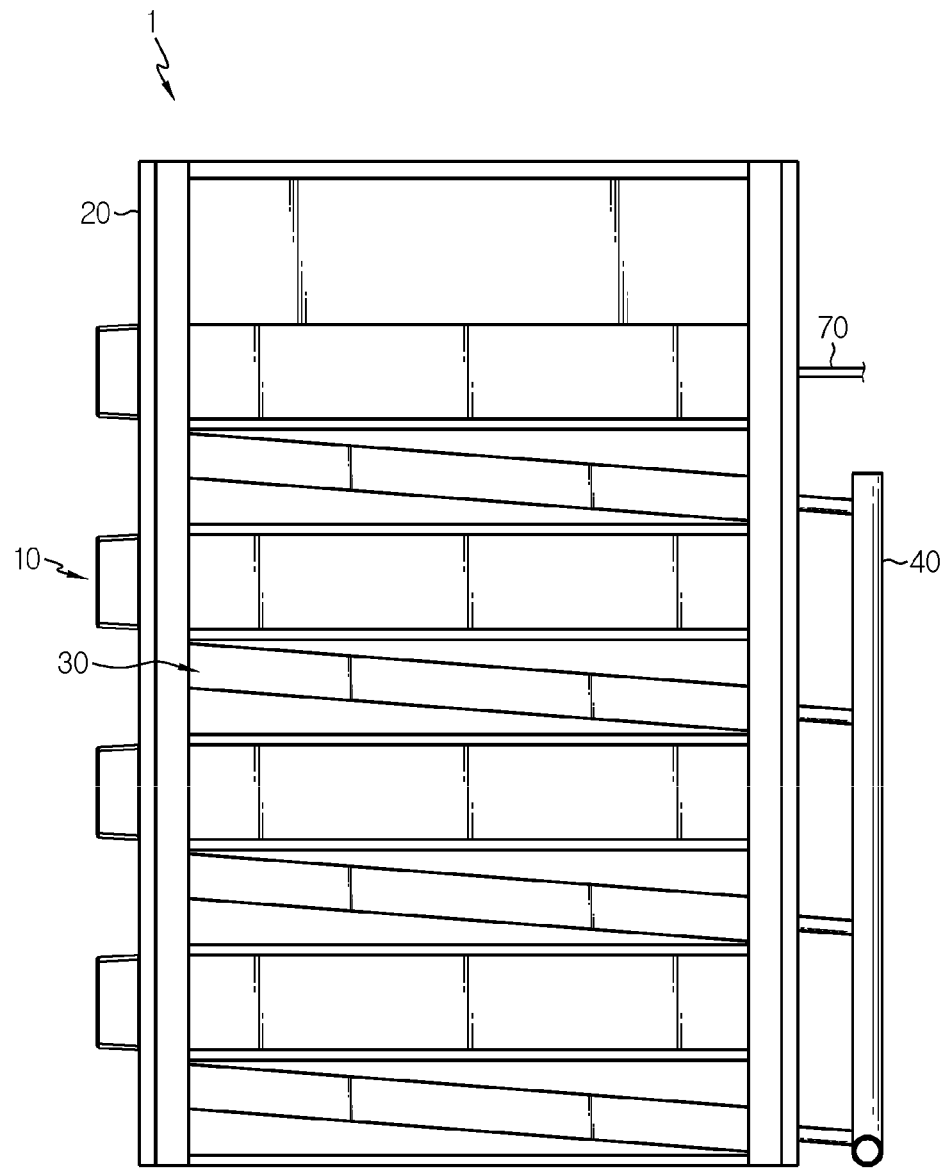
FIG. 2 is a side view showing the battery rack of FIG. 1.

FIG. 1 is a diagram for illustrating a battery rack according to an embodiment of the present disclosure, and FIG. 2 is a side view showing the battery rack of FIG. 1. Referring to FIGS. 1 and 2, the battery rack 1 may include a plurality of battery modules 10, a rack case 20 and a drainage guide unit 30.

Each of the plurality of battery module 10 includes at least one battery cell 100 (see FIG. 7) and a module case 200 (see FIG. 7) for accommodating the at least one battery cell 100, may include a fire extinguishing unit 300 (see FIG. 7) capable of supplying a fire extinguishing agent into the module case 200 when a thermal runaway or fire occurs in the at least one battery cell 100. Here, the fire extinguishing agent may be a fire extinguishing water that is prepared as water.

The rack case 20 is for accommodating the plurality of battery modules 10, and may be provided with a frame structure of a predetermined height or the like. In the rack case 20, the plurality of battery modules 10 may be stacked to a predetermined height. When the plurality of battery modules 10 are stacked in the rack case 20, the plurality of battery modules 10 may be disposed to be spaced apart from each other by a predetermined distance to secure cooling performance or the like.

The drainage guide unit 30 is for guiding the fire extinguishing agent used when the thermal runaway or fire occurs to be drained, and may be provided to the rack case 20. Specifically, the drainage guide unit 30 may be respectively provided between the plurality of battery modules 10 inside the rack case 20, and may be made of plastic or copper.

The drainage guide unit 30 may prevent the fire extinguishing agent from penetrating into battery modules 10 adjacent to the battery module 10 where the fire extinguishing agent is leaked, while guiding the fire extinguishing agent to be drained.

The drainage guide unit 30 may be disposed to have a predetermined slope along a front and rear direction of the rack case 20. Specifically, the drainage guide unit 30 may be provided to be inclined downward from a front side of the rack case 20 to a rear side of the rack case 20 so that the fire extinguishing agent is drained easily.

Hereinafter, the drainage guide unit 30 will be described in more detail.

Figure 3:
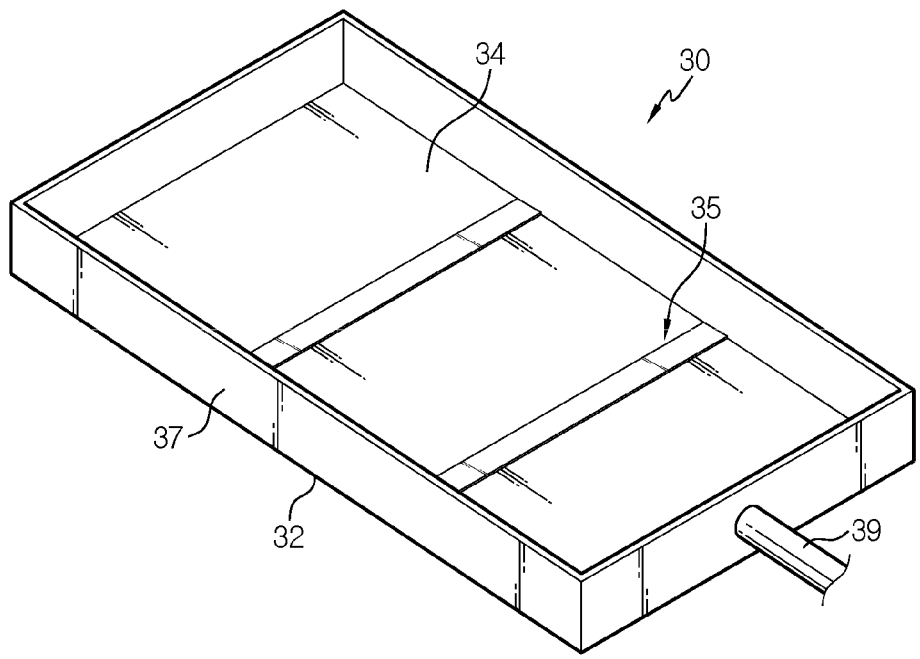
FIGS. 3 and 4 are diagrams for illustrating a drainage guide unit, provided to the battery rack of FIG. 1.
Figure 4:
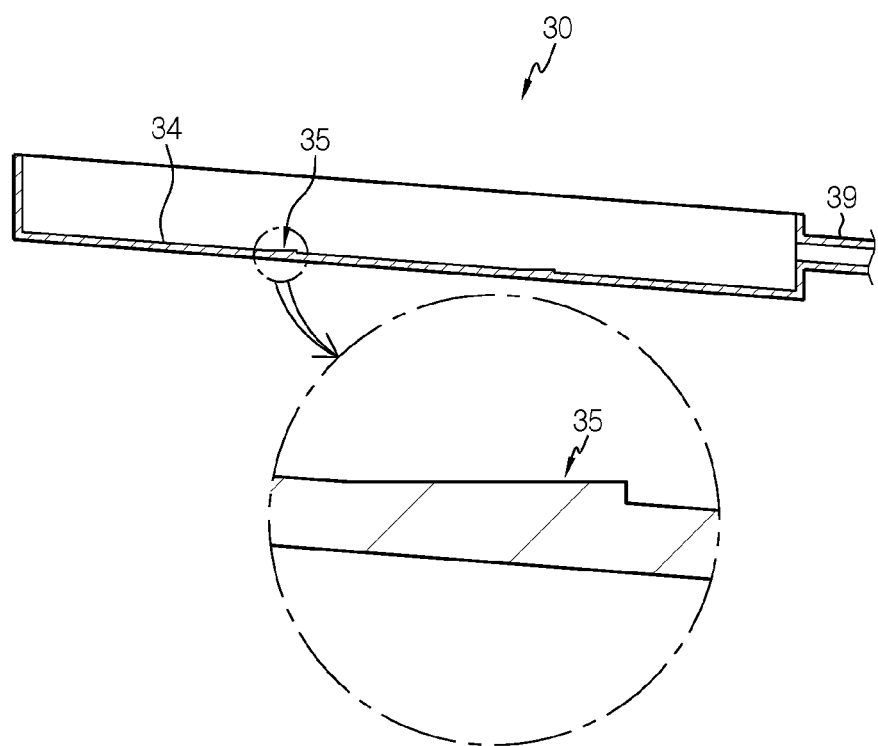

FIGS. 3 and 4 are diagrams for illustrating the drainage guide unit, provided to the battery rack of FIG. 1.

Referring to FIGS. 3 and 4, the drainage guide unit 30 may include a guide base 32, a guide channel 34, a guide wall 37, and a pipe connection portion 39.

The guide base 32 may form a bottom of the drainage guide unit 30. The guide base 32 may be provided to be inclined downward from the front side of the rack case 20 (see FIG. 2) to the rear side of the rack case 20.

The guide channel 34 is for guiding the fire extinguishing agent to move for drainage, and may be formed inside the guide base 32. The guide channel 34 may communicate with the pipe connection portion 39, explained later, to send the fire extinguishing agent toward the pipe connection portion 39.

The guide channel 34 may include a backflow barrier 35.

The backflow barrier 35 is for preventing the backflow of the fire extinguishing agent in the guide channel 34, and may be formed at an upper surface of the guide channel 34. The backflow barrier 35 may be provided in plural, and the plurality of backflow barriers 35 may be disposed to be spaced apart from each other by a predetermined distance along a longitudinal direction of the guide channel 34.

The guide wall 37 is provided at an edge side of the guide base 32, and may be formed to a predetermined height. The guide wall 37 may prevent the fire extinguishing agent in the guide channel 34 from being leaked to the outside.

The pipe connection portion 39 may communicate with the guide channel 32 and may be provided to the guide wall 37. The pipe connection portion 39 may communicate with a fire extinguishing agent discharge pipe 40, explained later, to guide the fire extinguishing agent in the guide channel 34 toward the fire extinguishing agent discharge pipe 40.

Figure 5:
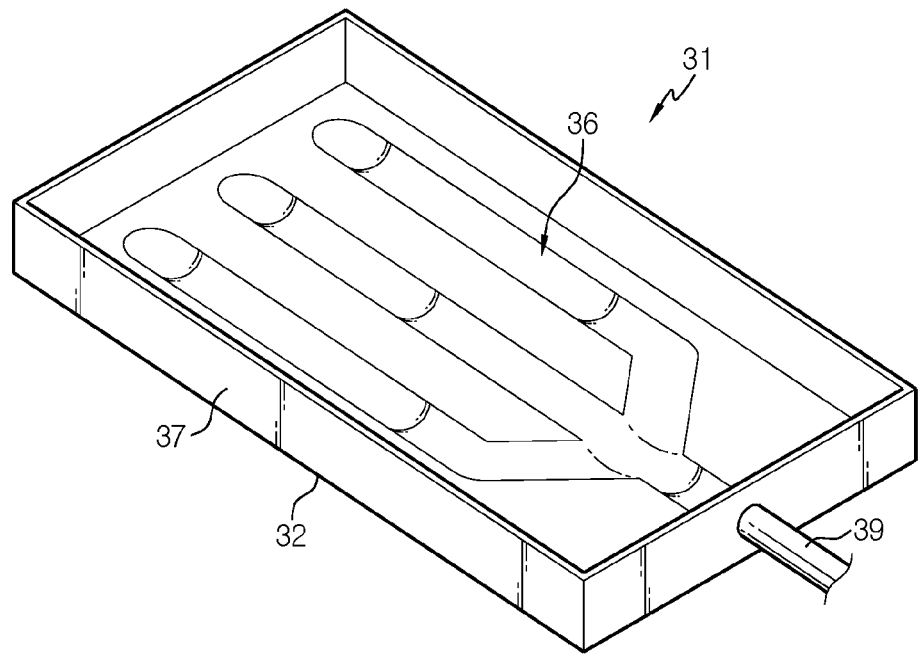
FIG. 5 is a diagram for illustrating a drainage guide unit according to another embodiment of the battery rack of FIG. 1.

FIG. 5 is a diagram for illustrating a drainage guide unit according to another embodiment of the battery rack of FIG. 1.

A drainage guide unit 31 according to this embodiment is similar to the drainage guide unit 30 of the former embodiment, and thus features substantially identical or similar to those of the former embodiment will not be described again, and features different from those of the former embodiment will be described in detail.

Referring to FIG. 5, the drainage guide unit 31 may include a guide base 32, a guide channel 36, a guide wall 37, and a pipe connection portion 39.

The guide base 32 is substantially identical or similar to that of the former embodiment, and thus will not be described again.

The guide channel 36 is provided to have a groove shape of a predetermined depth. That is, the guide channel 36 is provided in the shape of a plurality of channel grooves at one side of the guide base 32, which are integrated into a single channel groove at the other side of the guide base 32 toward the pipe connection portion 39. Through this guide channel 36, the fire extinguishing agent, namely the fire extinguishing water prepared as water, may flow more smoothly toward the pipe connection portion 39.

The guide wall 37 and the pipe connection portion 39 are substantially identical or similar to those of the former embodiment, and thus will not be described again.

Referring to FIGS. 1 and 2 again, the battery rack 1 may further include a fire extinguishing agent discharge pipe 40 and a fire extinguishing agent supply pipe 70.

The fire extinguishing agent discharge pipe 40 is for discharging the fire extinguishing agent, and may be connected to the drainage guide unit 30. Specifically, the fire extinguishing agent discharge pipe 40 may be provided at a rear side of the rack case 20 and connected in communication with the pipe connection portion 39 (see FIG. 3) of the drainage guide unit 30.

The fire extinguishing agent discharge pipe 40 may be connected in communication with a drain unit D (see FIG. 17), explained later, to send that the fire extinguishing agent in the drainage guide unit 30 toward the drain unit D.

The fire extinguishing agent supply pipe 70 may communicate with the fire extinguishing unit 300 (see FIG. 6) of the battery module 10, explained later, and a fire extinguishing tank unit T (see FIG. 17), explained later, so that when an abnormal situation such as fire occurs in at least one of the plurality of battery module 10, the fire extinguishing agent of the fire extinguishing tank unit T is guided to be supplied toward the battery module 10 where the abnormal situation occurs.

The fire extinguishing agent supply pipe 70 is disposed at the rear side of the battery rack 20 and may be provided at a position where the fire extinguishing agent supply pipe 70 does not interfere with the fire extinguishing agent discharge pipe 40.

Hereinafter, the battery module 10 of the battery rack 1 according to this embodiment will be described in more detail.

Figure 6:
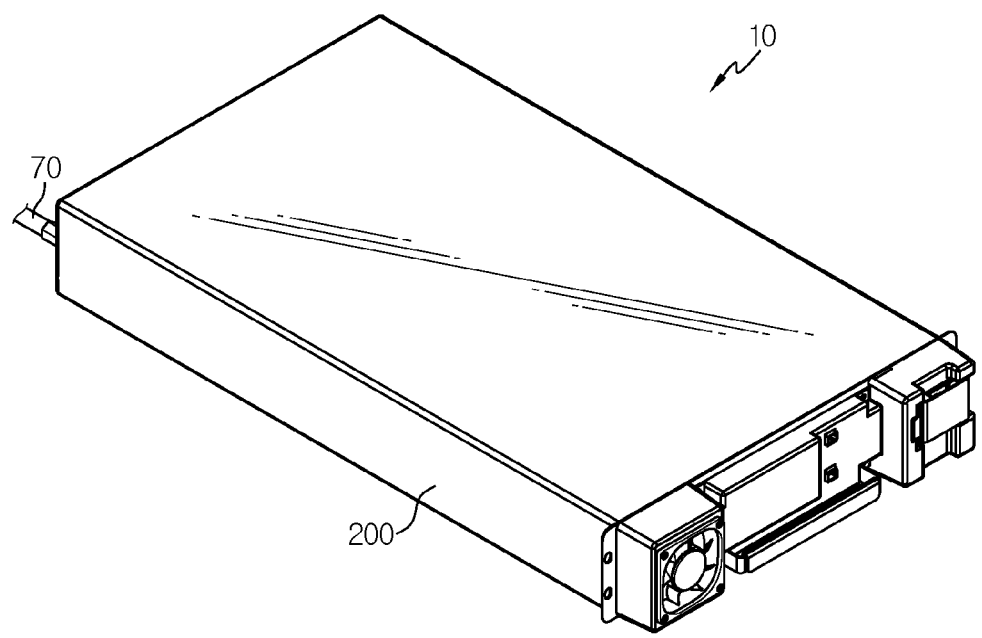
FIG. 6 is a diagram for illustrating a battery module, provided to the battery rack of FIG. 1.
Figure 7:
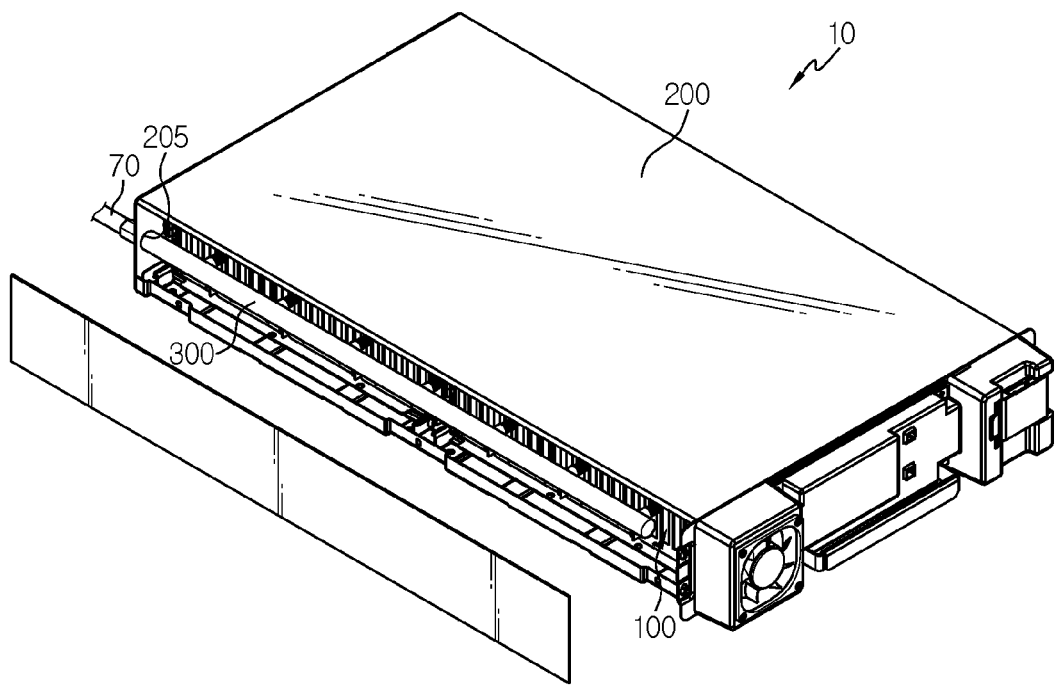
FIG. 7 is a partially exploded view showing the battery module of FIG. 6.

FIG. 6 is a diagram for illustrating a battery module, provided to the battery rack of FIG. 1, and FIG. 7 is a partially exploded view showing the battery module of FIG. 6. Referring to FIGS. 6 and 7, the battery module 10 may include a battery cell 100, a module case 200 and a fire extinguishing unit 300.

The battery cell 100 is a secondary battery, and may be provided as a pouch-type secondary battery, a rectangular secondary battery, or a cylindrical secondary battery. Hereinafter, in this embodiment, it will be described that the battery cell 100 is a pouch-type secondary battery.

At least one battery cell 100 or a plurality of battery cells 100 may be provided. Hereinafter, in this embodiment, it will be described that the battery cell 100 is provided in plural.

The module case 200 may accommodate the plurality of battery cells 100. To this end, an accommodation space for accommodating the plurality of battery cells 100 may be provided in the module case 200.

The module case 200 may has a connection hole 205.

The connection hole 205 is formed at a rear side of the module case 200, and may be provided as an opening of a predetermined size. The fire extinguishing unit 300, explained later, may pass through the connection hole 205.

The fire extinguishing unit 300 is mounted to penetrate into the module case 200 and is connected to a fire extinguishing tank unit T (see FIG. 17) containing a fire extinguishing agent to directly inject the fire extinguishing agent into the module case 200 when a thermal runaway occurs at the plurality of battery cells 100 or a fire occurs due to the thermal runaway or the like. Here, the fire extinguishing agent may be provided as water.

The fire extinguishing unit 300 may be connected to the fire extinguishing tank unit T via a fire extinguishing agent supply pipe 70. The fire extinguishing unit 300 may be disposed to penetrate into the module case 200 at one side end of the module case 200 to be elongated in a longitudinal direction of the module case 200.

Specifically, the fire extinguishing unit 300 may be mounted to penetrate into the module case 200 through the connection hole 205 of the module case 200 at one side of a rear surface of the module case 200, and may be communicatively connected to the fire extinguishing agent supply pipe 70.

In the case of this embodiment, when fire occurs at the battery cells 100 inside the battery module 10, since the fire extinguishing unit 300 directly injects the fire extinguishing agent into the module case 200, it is possible to more quickly and effectively extinguish the fire at an early stage.

Hereinafter, the fire extinguishing unit 300 according to this embodiment will be described in more detail.

Figure 8:
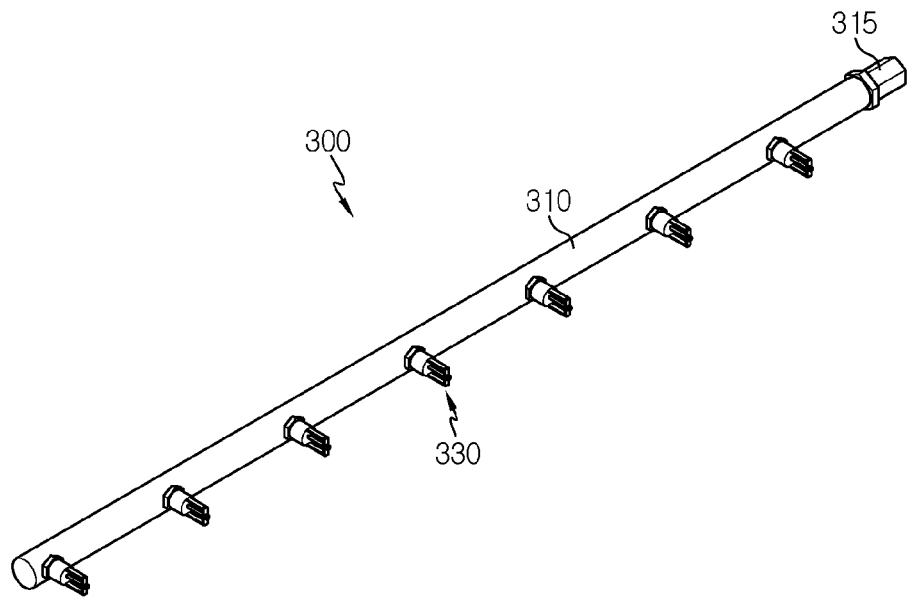
FIG. 8 is a diagram for illustrating a fire extinguishing unit, provided to the battery module of FIG. 7.

FIG. 8 is a diagram for illustrating a fire extinguishing unit, provided to the battery module of FIG. 7.

Referring to FIG. 8, the fire extinguishing unit 300 may include a unit body 310 and an injection nozzle 330.

The unit body 310 may be provided in an approximately elongated pipe shape in a predetermined length. The unit body 310 has an internal flow path formed therein for storage and movement of the fire extinguishing agent, and is connected to the fire extinguishing tank unit T (see FIG. 17), explained later, through the fire extinguishing agent supply pipe 70. Also, the unit body 310 may penetrate into the module case 200 to be elongated along the longitudinal direction of the module case 200.

A pipe fastening portion 315 may be provided at one end of the unit body 310.

The pipe fastening portion 315 is connected to the fire extinguishing agent supply pipe 70, and may be disposed to protrude at the rear of the module case 200, specifically out of the connection hole 205 of the module case 200, when the unit body 310 is mounted to the module case 200.

The injection nozzle 330 is for injecting the fire extinguishing agent toward the battery cells 100 inside the module case 200 (see FIG. 7), and may be provided to the unit body 310.

The injection nozzle 330 may be provided perpendicular to the unit body 310 and disposed to face the plurality of battery cells 100 inside the module case 200.

At least one injection nozzle 330 or a plurality of injection nozzles 330 may be provided. Hereinafter, in this embodiment, it will be described that the injection nozzle 330 is provided in plural.

The plurality of injection nozzles 330 may be disposed to be spaced apart from each other by a predetermined distance along the longitudinal direction of the module case 200. Hereinafter, the injection nozzle 330 will be described in more detail.

Figure 9:
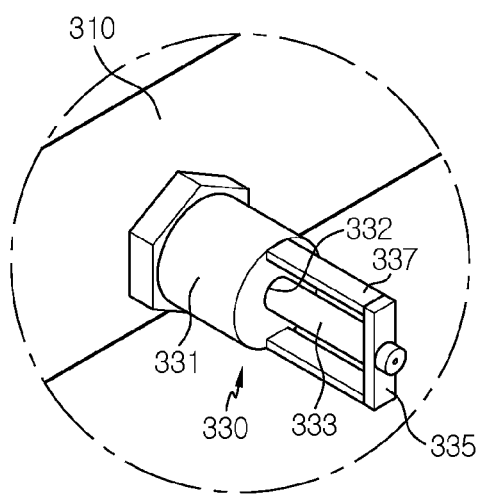
FIG. 9 is a diagram for illustrating an injection nozzle, provided to the fire extinguishing unit of FIG. 8.

FIG. 9 is a diagram for illustrating an injection nozzle, provided to the fire extinguishing unit of FIG. 8.

Referring to FIG. 9, the injection nozzle 330 may include a nozzle body 331, a glass bulb 333, a nozzle cap 335, and a guide rib 337.

The nozzle body 331 may be mounted to the unit body 310 to communicate with the internal flow path of the unit body 310. The nozzle body 331 may be disposed to protrude perpendicular to the longitudinal direction of the unit body 310.

The nozzle body 331 may have an injection hole 332.

The injection hole 332 is for injecting the fire extinguishing agent, and may communicate with the internal flow path of the unit body 310. When the injection hole 332 is opened, the fire extinguishing agent may be injected to the outside.

The glass bulb 333 is provided to the nozzle body 331, and is configured to cover the injection hole 332 so that the internal flow path of the unit body 310 is sealed. Also, the glass bulb 333 may be configured to be at least partially broken to open the internal flow path and the injection hole 332 when the inside of the module case 200 is exposed to an internal gas over a predetermined temperature.

The glass bulb 333 is filled with a predetermined substance such as a predetermined liquid or gas. Such a predetermined material may have a property of increasing in volume as the temperature increases. Specifically, the glass bulb 333 may be broken, melted or separated from the nozzle body 331 due to volume expansion of the predetermined material at the predetermined temperature, for example 70° C. to 100° C. or above to open the injection hole 332.

The nozzle cap 335 is spaced apart from the nozzle body 331 by a predetermined distance, and may support the glass bulb 333 together with the nozzle body 331. By means of the nozzle cap 335, the glass bulb 333 may be more stably supported by the nozzle body 331.

The guide rib 337 is provided in plural, and the plurality of guide ribs 337 may be connected to the nozzle body 331 and the nozzle cap 335, respectively. The plurality of guide ribs 337 may be spaced apart from each other by a predetermined distance, and may also be spaced apart from the glass bulb 333 by a predetermined distance.

The guide rib 337 may guide the high-temperature gas to be moved toward the glass bulb 333 so that the glass bulb 333 may be more smoothly broken or separated when a high-temperature gas over a predetermined temperature is generated inside the module case 200.

Figure 10:
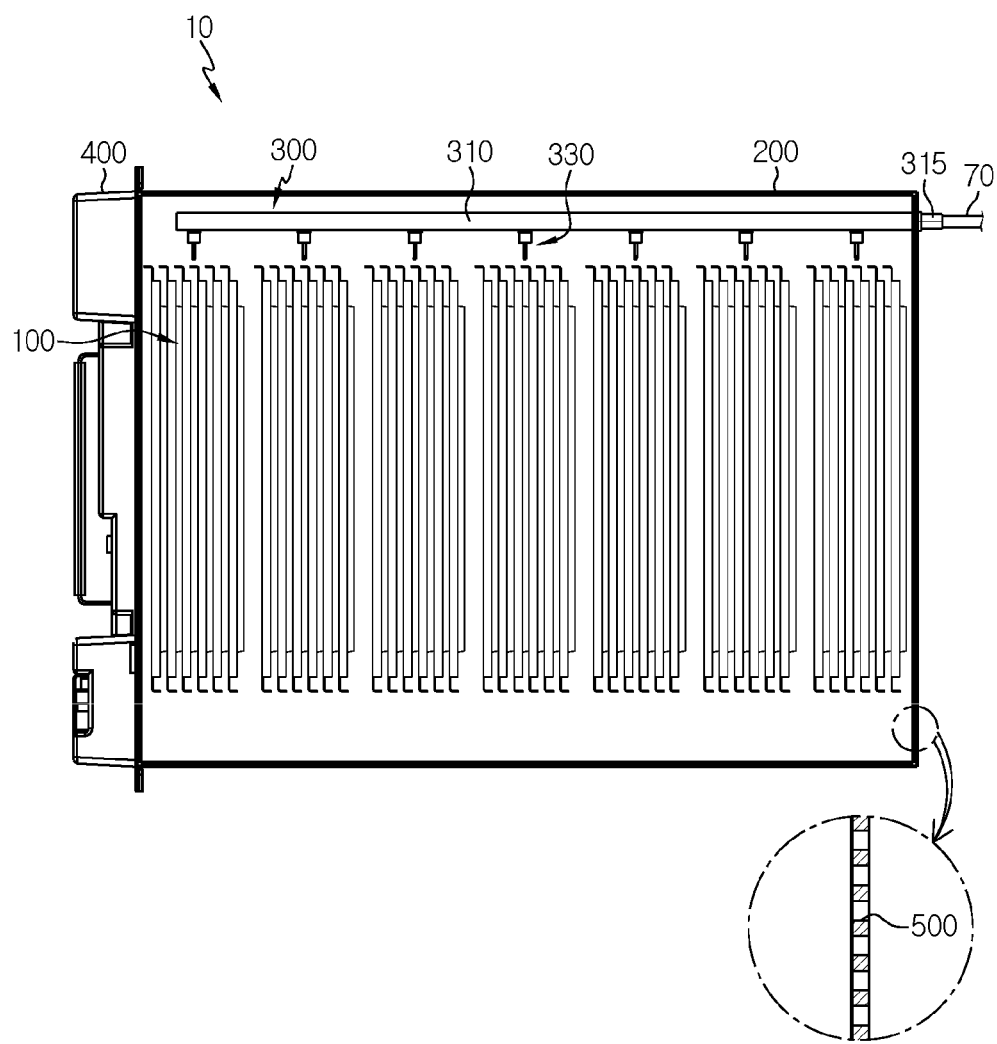
FIG. 10 is a sectional view showing the battery module of FIG. 6.

FIG. 10 is a sectional view showing the battery module of FIG. 6.

Referring to FIG. 10, the battery module 10 may further include a cooling air supply unit 400 and a cooling air discharge unit 500.

The cooling air supply unit 400 is provided at a front side of the module case 200, and may supply a cooling air into the module case 200 of the battery module 10 in order to cool the battery cells 100.

The cooling air discharge unit 500 is provided at a rear side of the module case 200, and may be disposed diagonally with the cooling air supply unit 400. The cooling air discharge unit 500 may discharge the air, which has cooled the battery cells 100 inside the module case 200, to the outside of the module case 200.

Hereinafter, a detailed mechanism of the fire extinguishing unit 300 according to this embodiment when an abnormal situation such as a fire situation of the battery module 10 according to this embodiment occurs will be described in detail.

FIGS. 11 to 14 are diagrams for illustrating a fire extinguishing agent injection mechanism inside a module case when fire or thermal runaway occurs in the battery module of FIG. 6.

Figure 11:
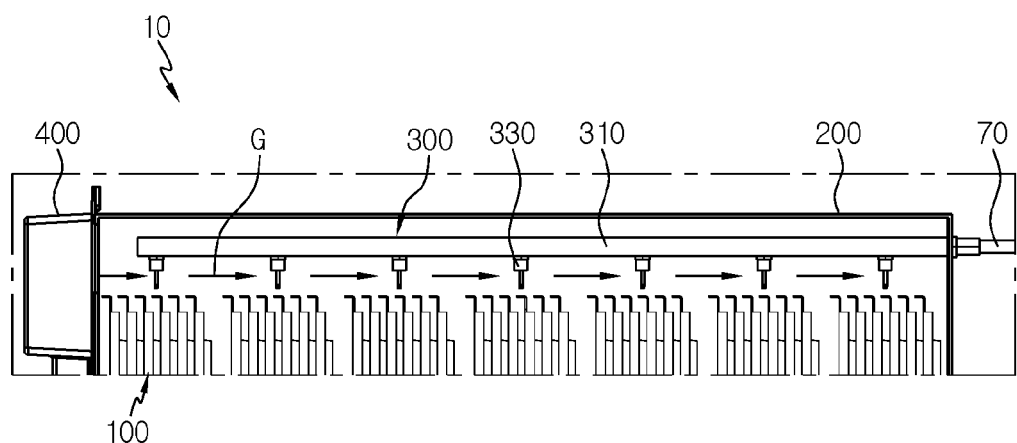
FIGS. 11 to 14 are diagrams for illustrating a fire extinguishing agent injection mechanism inside a module case when fire or thermal runaway occurs in the battery module of FIG. 6.

Referring to FIG. 11, in the battery cells 100 inside the module case 200 of the battery module 10, a fire situation or a thermal runaway situation caused by overheating may occur due to an abnormal situation in at least one battery cell 100. When such a fire situation or thermal runaway situation occurs, a high-temperature gas G may be generated inside the module case 200 due to the overheated battery cell 100.

Figure 12:
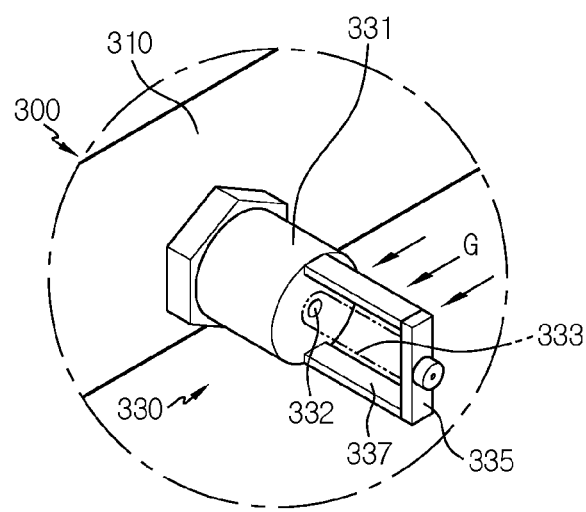
Figure 13:
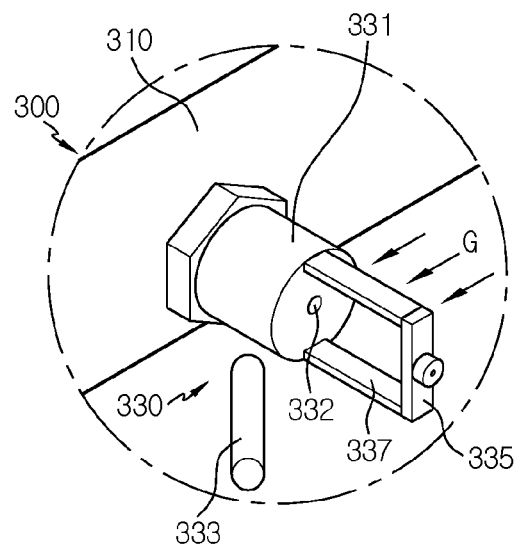

By means of the high-temperature gas G, the glass bulb 333 of the fire extinguishing unit 300 may be broken or melted, as shown in FIG. 12 or, the glass bulb 333 may be separated from the nozzle body 331 as shown in FIG. 13, thereby opening the injection hole 332 through which the fire extinguishing agent may be injected.

Figure 14:
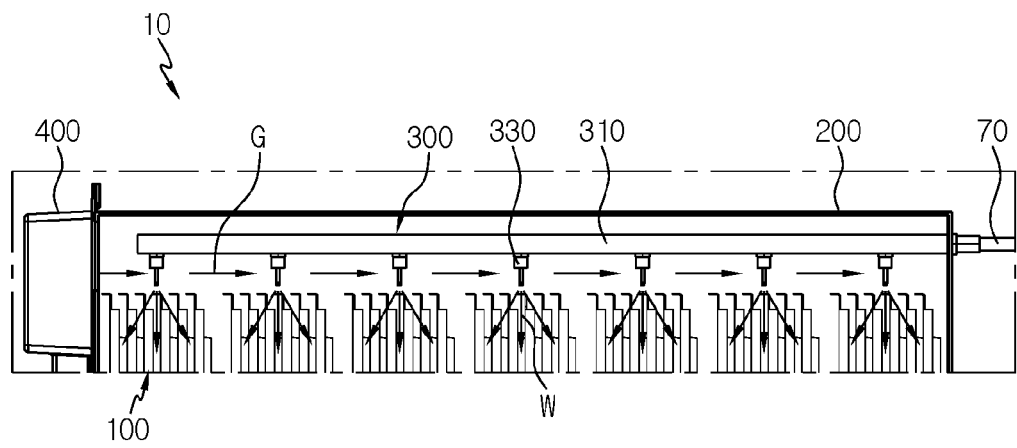

Referring to FIG. 14, in this embodiment, as the injection hole 332 is opened, the fire extinguishing agent W, namely the water W, inside the fire extinguishing unit 300 may be immediately and directly injected toward the battery cells 100.

Accordingly, in this embodiment, when a fire situation or a thermal runaway situation occurs at the battery module 10, since the fire extinguishing agent is immediately and directly injected toward the battery cells 100 inside the module case 200 by means of the fire extinguishing unit 300, it is possible to more quickly and rapidly extinguish the fire or thermal runaway situation at an early stage.

Therefore, in this embodiment, by rapidly extinguishing the fire or thermal runaway situation at an early stage, it is possible to more effectively prevent a dangerous situation such as a secondary explosion from occurring due to the transfer of heat or flame to neighboring battery cells 100 in advance.

Hereinafter, after the fire extinguishing agent is injected, the mechanism of draining the fire extinguishing agent W from the battery rack 1 and preventing the fire extinguishing agent from flowing toward neighboring battery modules 10 will be described in more detail.

Figure 15:
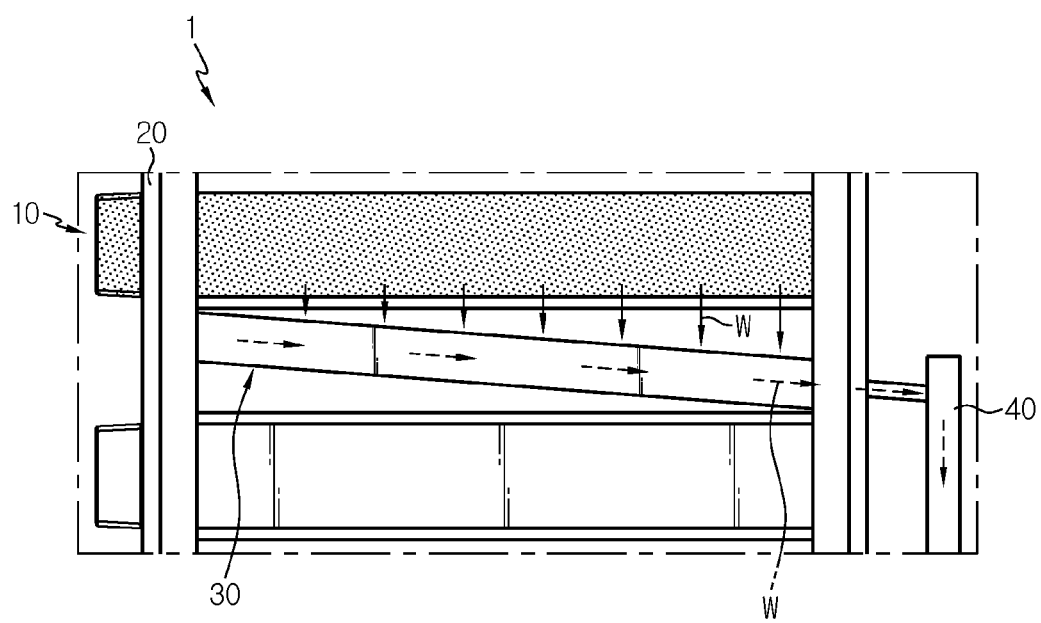
FIG. 15 is a diagram for illustrating the process of draining the fire extinguishing agent by using the drainage guide unit of the battery rack of FIG. 1 and preventing the fire extinguishing agent from flowing toward neighboring battery modules.

FIG. 15 is a diagram for illustrating the process of draining the fire extinguishing agent by using the drainage guide unit of the battery rack of FIG. 1 and preventing the fire extinguishing agent from flowing toward neighboring battery modules.

Referring to FIG. 15, in the battery rack 1, when the fire extinguishing agent W is injected to the battery module 10 since the thermal runaway or fire occurs, the fire extinguishing agent W may be leaked to the outside due to an assembly tolerance of the battery module 10 or through a gap such as a hole.

At this time, the fire extinguishing agent W leaked from the battery module 10 may damage neighboring battery modules 10, which are normally operating regardless of the fire situation or the like. In particular, if the battery modules 10 are stacked in the height direction inside the battery rack 20, battery modules 10 disposed under the battery module 10 where the fire extinguishing agent W is injected may be exposed to such a dangerous situation due to the own weight of the fire extinguishing agent W.

In this embodiment, since the drainage guide unit 30 is respectively provided between the battery modules 10 in the height direction of the battery rack 20, it is possible to effectively prevent the fire extinguishing agent W leaked from the battery module 10 from being introduced to neighboring battery modules 10, namely battery modules 10 disposed below the battery module 10 where the fire extinguishing agent W is injected.

Moreover, if the fire extinguishing agent W is leaked from the battery module 10 into which the fire extinguishing agent W is injected, the drainage guide unit 30 may guide the leaked fire extinguishing agent W toward the fire extinguishing water discharge pipe 40 so that the fire extinguishing agent W is drained smoothly.

As described above, by means of the drainage guide unit 30, the battery rack 1 according to this embodiment may physically block the fire extinguishing agent W not to penetrate between neighboring battery modules 10 and also more effectively control the fire extinguishing agent W to be drained.

Figure 16:
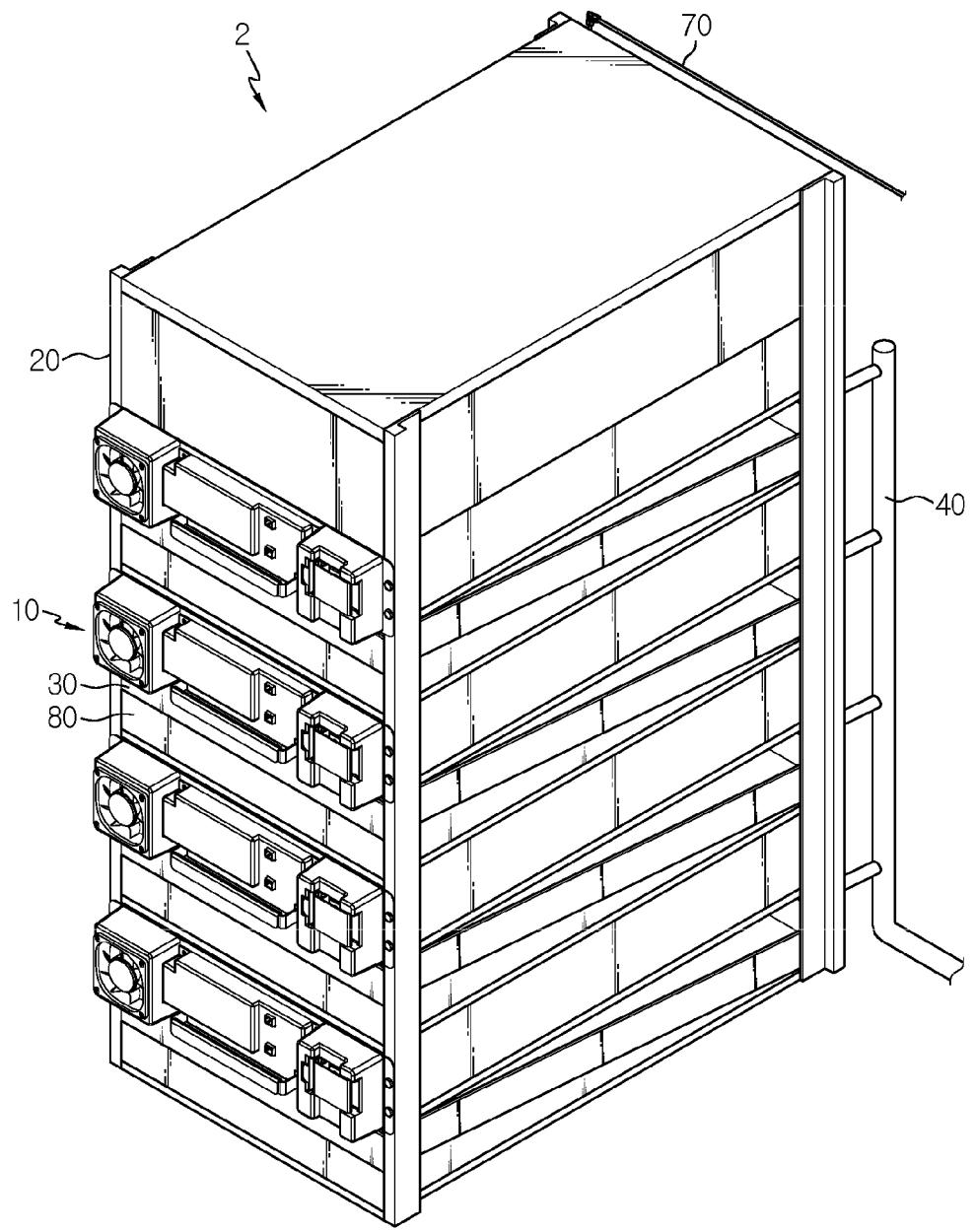
FIG. 16 is a diagram for illustrating a battery rack according to another embodiment of the present disclosure.

FIG. 16 is a diagram for illustrating a battery rack according to another embodiment of the present disclosure.

The battery rack 2 of this embodiment is similar to the battery rack 1 of the former embodiment, and thus features substantially identical or similar to those of the former embodiment will not be described again, and features different from those of the former embodiment will be described in detail.

Referring to FIG. 16, the battery rack 2 may include a plurality of battery modules 10, a rack case 20, a drainage guide unit 30, a fire extinguishing agent discharge pipe 40, a fire extinguishing agent supply pipe 70, and an auxiliary guide member 80.

The plurality of battery modules 10, the rack case 20, the drainage guide unit 30, the fire extinguishing agent discharge pipe 40 and the fire extinguishing agent supply pipe 70 are substantially identical or similar to those of the former embodiment and thus will not be described again.

The auxiliary guide member 80 is mounted to the rack case 20 and may be provided in plural. The plurality of auxiliary guide members 80 may be provided to a lower side of the drainage guide units 30, respectively, to support the plurality of drainage guide units 30.

In this embodiment, the plurality of drainage guide units 30 may be supported and fixed more stably by means of the plurality of auxiliary guide members 80 inside the rack case 20.

The plurality of auxiliary guide members 80 may guide the fire extinguishing agent to be prevented from penetrating toward neighboring battery modules 10, along with the plurality of drainage guide units 30.

The plurality of auxiliary guide members 80 may be made of a material capable of absorbing an external shock or a fire extinguishing agent so as to achieve a buffer effect in addition to the effect of preventing penetration of the fire extinguishing agent.

Figure 17:
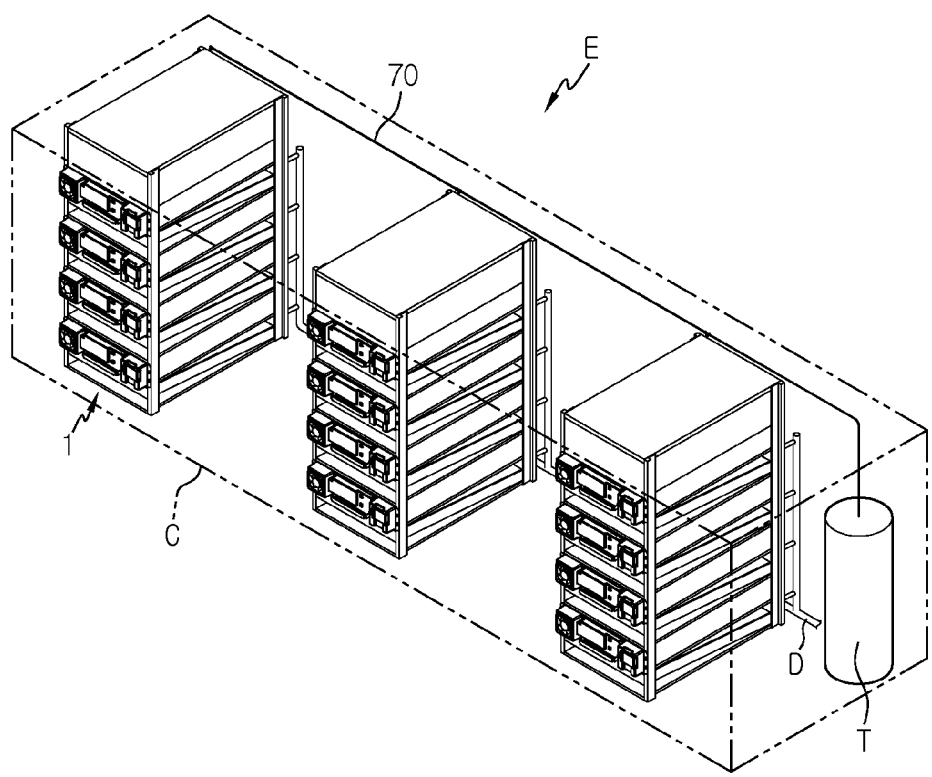
FIG. 17 is a diagram for illustrating an energy storage system according to an embodiment of the present disclosure.

FIG. 17 is a diagram for illustrating an energy storage system according to an embodiment of the present disclosure.

Referring to FIG. 17, an energy storage system E may be used for home or industries as an energy source. The energy storage system E may include at least one battery rack 1 of the former embodiment, or a plurality of battery racks 1 in this embodiment, and a rack container C for accommodating the plurality of battery racks 1.

The plurality of battery racks may be configured using the battery rack 2 of the former embodiment, instead of the battery rack 1 of the former embodiment. Alternatively, it is also possible that the plurality of battery racks are configured using both the battery rack 1 and the battery rack 2.

The energy storage system E may further include a fire extinguishing tank unit T and a drain unit D.

The fire extinguishing tank unit T is provided inside the rack container C, and may supply a fire extinguishing agent to the plurality of battery racks 1. For this purpose, the fire extinguishing tank unit T is filled with the fire extinguishing agent, namely a fire extinguishing water prepared as water.

The drain unit D is for draining or storing the fire extinguishing agent, and may be connected to the fire extinguishing agent discharge pipe 40 of the battery rack 10. The drain unit D can be connected to a drainage facility or septic tank inside or outside the rack container C.

Since the energy storage system E of this embodiment includes the battery rack 1, 2 of the former embodiment, the energy storage system E may have all advantages of the battery rack 1, 2 of the former embodiment.

According to various embodiments as above, it is possible to provide a battery rack 1, 2 capable of more rapidly extinguishing thermal runaway or fire at an early stage when thermal runaway or fire occurs in the battery module 10, and an energy storage system e including the battery rack 1, 2.

Moreover, according to various embodiments as above, it is possible to provide a battery rack 1, 2 capable of guiding a fire extinguishing agent used for fire suppression of battery modules 10 of the battery rack 1, 2 to be drained, and an energy storage system E including the battery rack 1, 2.

In addition, according to various embodiments as above, it is possible to provide a battery rack 1, 2 capable of preventing the fire extinguishing agent used for fire suppression of a specific battery module 10 of the battery rack 1, 2 from flowing toward neighboring battery modules 10, and an energy storage system E including the battery rack 1, 2.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
   a plurality of battery modules, each battery module of the plurality of battery modules including at least one battery cell, a module case configured to accommodate the at least one battery cell and a fire extinguisher capable of supplying a fire extinguishing agent into the module case when thermal runaway or fire occurs in the at least one battery cell;
   a rack case configured to accommodate the plurality of battery modules; and a drainage guide provided to the rack case and configured to guide the fire extinguishing agent used when the thermal runaway or fire occurs, wherein an angle of inclination of the drainage guide with respect to a vertical direction is different than an angle of inclination of the plurality of battery modules with respect to the vertical direction.

2. The battery rack according to claim 1, wherein the drainage guide is respectively provided between the plurality of battery modules inside the rack case.

3. The battery rack according to claim 2, wherein the drainage guide is disposed to have a predetermined slope along a first direction of the rack case.

4. The battery rack according to claim 3, wherein the drainage guide is downwardly inclined from a first side of the rack case to a second side of the rack case.

5. The battery rack according to claim 1, further comprising:

a fire extinguishing agent discharge pipe connected to the drainage guide and configured to discharge the fire extinguishing agent.

6. The battery rack according to claim 5, wherein the fire extinguishing agent discharge pipe is provided at a rear side of the rack case.

7. The battery rack according to claim 1, wherein a top surface of the drainage guide includes a guide channel for guiding the fire extinguishing agent to move for drainage.

8. The battery rack according to claim 1, wherein the drainage guide is made of plastic or copper.

9. The battery rack according to claim 1, wherein the fire extinguishing agent is water.

10. An energy storage system, comprising at least one battery rack as defined in claim 1.

11. The battery rack according to claim 1, wherein the drainage guide comprises a pipe connection portion at a lower end of the drainage guide.

12. The battery rack according to claim 11, further comprising a fire extinguishing agent discharge pipe connected to the pipe connection portion.

13. The battery rack according to claim 1, wherein the drainage guide comprises a guide base and guide walls extending upward from the guide base.

14. The battery rack according to claim 13, wherein the drainage guide further comprises a pipe connection portion extending from the guide walls.

15. The battery rack according to claim 1, further comprising a fire extinguishing agent supply pipe.

* * * * *